United States Patent [19]

Saad et al.

[11] 4,383,062

[45] May 10, 1983

[54] WATERBORNE COATING COMPOSITIONS

[75] Inventors: William T. Saad, Burnt Hills; Robert F. Stodgell, Schaghticoke, both of N.Y.

[73] Assignee: General Electric, Waterford, N.Y.

[21] Appl. No.: 229,226

[22] Filed: Jan. 28, 1981

[51] Int. Cl.³ .............................. C08L 1/00; C08L 1/26
[52] U.S. Cl. ........................................ 524/35; 524/42; 524/43; 524/46
[58] Field of Search .................... 260/13, 29.2 M; 523/103; 529/43; 524/3 T, 42–46, 35

[56] References Cited

U.S. PATENT DOCUMENTS

| | | | |
|---|---|---|---|
| 2,839,429 | 6/1958 | Marsh et al. | 260/29.2 M |
| 3,389,102 | 6/1968 | Schnurrbusch | 260/29.2 M |
| 3,423,340 | 1/1969 | Marshall | 260/13 |
| 3,458,333 | 7/1969 | Schnurrbusch | 260/29.2 M |
| 3,928,056 | 12/1975 | Szuhaj | 106/243 |
| 4,028,339 | 6/1977 | Merrill | 260/185 |
| 4,056,492 | 11/1977 | Merrill | 260/185 |
| 4,097,298 | 6/1978 | Haeufler et al. | 106/243 |
| 4,127,419 | 11/1978 | Szuhaj et al. | 106/243 |
| 4,155,887 | 5/1979 | Hetson | 524/43 |
| 4,218,250 | 8/1980 | Kasprzak | 260/13 |
| 4,277,382 | 7/1981 | Lin | 260/29.2 M |

FOREIGN PATENT DOCUMENTS 2609157 9/1976 Fed. Rep. of Germany ........ 260/13

OTHER PUBLICATIONS

Chem. Abst. 77:36246p.
Gen. Elect. Co. Product Data Sheet, SR-141, Jul. 79.
Gen. Elect. Co. Pro. Data Sht. SR 224, Feb. 79.
Methocel-Dow Chem.

*Primary Examiner*—Theodore Morris

[57] ABSTRACT

Waterborne silicone coating formulations are provided. The coatings utilize water based emulsions or organopolysiloxane resins where the emulsions are provided with an effective combination of cellulosic and anionic emulsifying agents. The coatings of the present invention offer durability and resistance to extreme temperatures.

21 Claims, No Drawings

WATERBORNE COATING COMPOSITIONS

BACKGROUND OF THE INVENTION

This invention relates to waterborne silicone coating compositions utilizing water based emulsions of organopolysiloxane resins which are useful in coating applications where aqueous emulsions are preferable over traditional organic solvent based systems. The present invention provides both waterborne silicone coating compositions as well as methods for producing such compositions.

Silicone resins are often selected for applications requiring premium properties. These organopolysiloxane resins are known to offer outstanding endurance to environmental conditions such as weathering and extreme heat and cold. Such siliconeresins have found utility in a variety of applications such as pressure sensitive adhesives and release coatings. Furthermore, they have been found to be particularly useful in the paint industry which is continually seeking coating formulations which offer premium properties. Silicone resin solutions have previously been used in the paint coatings industry as vehicles and binders which are a necessary part of quality paint formulations.

Heretofore, silicone resins were ordinarily supplied to formulators in solutions, that is to say, the resin consisted of so many parts by weight of silicone solids in some organic solvent such as xylene or toluene. However, recently the use of such organic solvents has been discouraged due to escalating costs for organic materials and increased concern for environmental considerations. Organic solvent based silicone resins often required the use of costly and cumbersome pollution abatement procedures and equipment. Thus there has been a trend in recent years for silicone resin systems which are water based and therefore not dependent upon organic solvents.

However, such silicone resins which have been found to be particularly useful for paints and other coatings have often been immiscible or otherwise incompatible with aqueous coating systems. The copending patent application of Frank J. Traver, Ser. No. 229,247 filed Jan. 28, 1981, herewith and which is hereby incorporated by reference, provides silicone resins which can be readily dispersed into water based emulsion compositions thereby providing the beneficial properties of silicone resins without the cumbersome necessity of unduly large amounts of organic solvents. Such silicone-water emulsions can now be utilized to provide superior coating formulations as described in the present application.

As noted above, silicone resins are intended as high performance coating vehicles or binders which can be used in high temperature-resistant coatings and will generally outperform conventional organic resins in similar applications. Those skilled in the art will recognize that there are a number of silicone resins which can be utilized in coating applications. Those silicone resins provided in U.S. Pat. Nos. 4,028,339 and 4,056,492 (both issued to Merrill) are examples of silicone resins which can be made part of water-based emulsions which form the basis of the paint formulations of the present invention. Both of these patents are hereby incorporated by reference.

Previously known silicone resin emulsions have been successfully utilized in coating glass fabric, however, such compositions require the use of nonionic emulsifiers such as alkylphenoxy polyethoxyethanols. In such a system there is generally required approximately one part emulsifier for each nine parts of resin solids. When this type of emulsion technology is attempted in conjunction with the resin coating formulations discussed herein, as required by industrial paint formulators, residual emulsifier is entrained in the coating and has a significant deleterious effect on such coatings at elevated temperatures.

On the other hand, the water based silicone resin emulsions utilized in the coatings of the present invention utilize an emulsion system based upon a combination of anionic emulsifiers and certain methylcellulose ether compositions. The total emulsifier requirement for these emulsions is generally in the range of approximately 0.5 to 2 percent based upon the weight of the silicone resin solids as compared to approximately 11% in the aforementioned emulsions. Furthermore, the reduction in organic emulsifier still enables the silicone resin film to function satisfactorily as a coating. Additionally, it seems that the use of methylcellulose agents enables the water based compositions to coat out more uniformly as compared to the above-described emulsions utilizing nonionic emulsifiers.

It is therefore a primary object of the present invention to provide waterborne organopolysiloxane resins which are particularly useful paint and coating formulations.

It is another object to provide novel waterborne silicone paints which exhibit improved durability and endurance toward climatic conditions as well as superior coating properties.

It is another object to provide paint formulations which are particularly useful in high temperature applications.

It is another object to provide a process for producing such waterborne silicone resin coating formulations.

These and other objects will become apparent to those skilled in the art upon consideration of the accompanying description and claims.

SUMMARY OF THE INVENTION

The present invention provides silicone based waterborne coatings utilizing silicone resin and water emulsions. These coatings are especially weather durable and are useful as protective coatings in such applications as wood burning stoves, mufflers and auto exhaust systems, smoke stacks, and space heaters, etc.

These waterborne coatings may be provided in a two step operation where there first is prepared a mill base at high speed and high sheer. Next is the let-down step, where the resin-water emulsion is added to the mill base and followed by gentle mixing to avoid breaking the emulsion. The viscosity of the coating can be adjusted with reference to the desired end use of the product, whereupon the coating may be applied by such means as spraying, brushing, flow coating, dip coating, etc. The coated part is then allowed to air dry, and subsequently cured by heating.

A typical paint formulated by the method of the present invention could have the following physical properties: pigment to binder ratio (P/B) varying from, approximately, 0.6 to 1 through 1.8 to 1; a total weight percent solids content of, approximately, 30 to 70%, a pH range of, approximately, 6 to 10, a viscosity of, approximately, 40 to 200 centipoise as measured by a Brookfield RVF or 20 to 50 sec. as measured by a No.

4 Ford Cup; a density of approximately, 8.5 to 9.5 lbs. per gallon, a volatile organic compounds content of, approximately, 2.2 to 2.8 lbs. per gallon, and a gloss of, approximately, from 7 to 94 on the 60° specular scale depending upon the type of formulation, grind, and P/B ratio, etc. Those skilled in the art will recognize the P/B ratio as indicating the quantity by weight of binder or resin used with a specified amount of a particular pigment.

Cure cycles can be varied according to cure temperature. For example, for a typical equivalent dry coating of 1 mil thickness, the coating will cure in 25 to 35 minutes at 400 F. and in 20 to 25 minutes at 450 F., and in 10 to 15 minutes at 600 F. Such a typical coating might show a pencil hardness ranging from HB to 2H, a Mandrel Flex of three quarters of an inch to greater then 1 inch and will ordinarily pass a thermal shock test at 600 F. Indeed, the coating formulated in accordance with Example 2 below was able to withstand temperatures of up to 1100 F. for 16 hours on a low carbon steel substrate without showing evidence of checking, cracking, blistering, or loss of adhesion.

The above described process can be altered without deviating from the spirit of the present invention in order to provide additional waterborne silicone based coatings by varied routes. For example, it is possible to first emulsify the pigments before mixing the additional ingredients of the mill base. Also it is possible to include a portion of the water based silicone resin emulsion in the mill base.

In general, the waterborne silicone coating compositions of the present invention will utilize (a) a silicone resin-water emulsion comprised of 100 parts by weight of (i) at least one organopolysiloxane resin composition comprising units selected from the group consisting of $R_3SiO_{0.5}$, $R_2SiO$, $R-SiO_{1.5}$ and $SiO_2$, wherein R is, independently, a substituted or unsubstituted monovalent hydrocarbon radical and said organopolysiloxane resin has an R to Si ratio of, approximately, 1.0 to 1.99 R groups for each silicon atom; (ii) a combination of emulsifying agents effective for dispensing said organopolysioloxane resin in a water based emulsion wherein said emulsifying agent combination is comprised of 5 to 95 percent by weight of a cellulosic emulsification agent and 5 to 95 percent by weight of an anionic surfactant; and (iii) an amount of water effective for providing a preselected silicone resin solids content by weight of said silicone resin-water emulsion.

A typical waterborne silicone coating composition which contains, approximately, 50 to 70 parts by weight of silicone resin-water emulsion (a) will also be comprised of (b) 25 to 50 parts by weight pigment; (c) 4 to 12 parts by weight coupling solvent; (d) 0 to 1 parts by weight neutralizing agent; (e) 4 to 8 parts by weight water; (f) 0 to 0.2 parts by weight catalyst. These ingredients are well known in the coating art and will be discussed in detail below.

DESCRIPTION OF THE INVENTION

The silicone based waterborne coatings of the present invention may optionally contain some or all of the following ingredients, including pigments, pigment dispersants, coupling solvents, initiators, crosslinkers, surfactants, antifoams, pH buffers, anti-rust agents, biocides and fungicides, extenders, thickeners, neutralizing amines, coalescing agents, platicizers, binders, catalysts or driers, antifreeze agents, colorants, and water, etc.

The pigments are those substances, usually in the form of dry powders which impart color to the composition. Pigments are generally insoluble in organic solvents but not necessarily so. Among the inorganic pigments which may be useful are the metallic oxides such as iron oxide, titanium oxide, zinc oxide, cobalt oxide, and chromium oxide. Also useful are metal powder suspensions such as gold or aluminum as well as the earth colors such as siennas, ochers and umbers. Other pigments include the lead chromates as well as mica and talc.

Pigment dispersants are additives which increase the stability of a suspension or an emulsion of powders in a liquid media. These dispersants are anionic and nonionic surfactants which wet the particles, thereby allowing particle separation and the prevention of coagulation. Examples of pigment dispersants are DISPERSE-AYD W-22 and W-28 which are available from Daniel Products Company, Tamol-731 available from Rohm and Haas. Numerous other pigment dispersants are available.

Coupling solvents are those which allow two immiscible liquids to mix readily, thereby facilitating solvent compatability in aqueous systems. Examples of suitable coupling solvents are propylene glycol, Butyl Cellosolve (ethylene glycol monobutyl ether), and Texanol (2,2,4-trimethyl-1,3-pentanediol monoisobutyrate).

Initiators are materials which thermally or chemically decompose into active compounds or free radicals which can act upon reactants to cause polymerization. These initiators release free radicals which can attack such materials as acrylics and cause a chain reaction to form a polymer. These initiators are useful in paint formulations since they perpetuate the growth of the polymer, thereby completing a homogeneous coating film. Examples of these initiatiors include benzoyl peroxide, potassium persulfate and ammonium persulfate.

Crosslinkers are substances which promote a reaction between reactive polymers thereby forming a three dimensional structure in a coating. A crosslinker reacts chemically with the molecular chains and links them together for structural rigidity. Examples of suitable crosslinkers for paint formulations include CYMEL-301 and CYMEL-303 which are available from American Cyanamid Company. CYMEL-301 for example is a methoxy methyl melamine initiator which is useful as a crosslinker in coating formulations. Other suitable crosslinkers include Monsanto Resimene X-712 and X-714.

Surfactants are additives which improve the wetting of a coating thereby helping pigment dispersion and inhibiting foam as well as promoting emulsification. Surfactants are also useful for reducing surface tension in a coating. Examples of suitable surfactants used in paint formulations are carboxy methyl cellulose, sodium lauryl sulfate, ammonium oleate, as well as many other surfactants which are well known in the coatings art.

Antifoams are additives which are utilized to prevent the formation of foam in a system. Antifoams act by reducing surface tension and allowing the easy escape of entrained gasses. Examples of suitable antifoams include AF-60, AF-72, and AF-75 which are silicone fluids available from General Electric Company.

Buffer control agents are materials which control the pH or hydrogen ion concentration in an aqueous system by raising or lowering the acidity or basicity to desired levels. Examples of suitable buffering agents for coating systems include dimethyl ethanol amine, triethyl amine, and ammonium hydroxide. It is generally preferred that paint formulations have a basic pH since basicity serves to retard fungi and bacterial growth in such formulations.

Anti-rust agents are compounds which prevent oxidation of metal surfaces by being absorbed or reacted with the metal surfaces to form an impervious barrier to such oxidation. Examples of suitable anti-rust agents for paint formulations include zinc, potassium dichromate, sodium dichromate and borax.

Biocides and fungicides are also included in paint formulations as agents which destroy or prevent the growth of fungi and spores. These compounds chemically react with airborne pollutants and render them inactive in order to prevent contamination of the coating formulation. An example of such a biocide/fungicide is zinc oxide.

Extenders are pigments of low refractive index, i.e., 1.6 or below which are reasonably chemically non-reactive and generally of lower cost than other pigments and which may therefore be added to paint formulation to enhance the hiding power of white pigments and color. In addition to cost reduction, extenders often improve durability without altering the appearance of the paint formulation. Examples of such extenders include mica, talc, clay and barium sulfate.

Neutralizing amines are chemicals which neutralize the acidic materials in paint formulations in order to prevent the loss of the emulsions. These amines raise the pH of the coating so as to prevent premature coagulation or loss of emulsion. An example of such a neutralizing amine is dimethyl amine ethanol. Such compounds can also be considered as reactants since it is felt that they may serve to assist initiation of the coating reaction.

Coalescing agents are solvents with relatively higher boiling points than water which therefore stay behind in a coating formulation after the water has evaporated. Such coalescing agents aid in film formation by temporarily softening the vehicle or by fusing together the latex film after the water has evaporated. Examples of such coalescing agents include Texanol, Butylcellosolve and Dowanol DE.

Plasticizers are additives for painting formulations which assist in softening coating films. The plasticizers allow film deformation and cause the film to yield to flow and thereafter return to normal. Examples of suitable plasticizers include butyl stearate and diethyl phthalate.

Binders are non-volatile portions of a liquid vehicle in a coating. Binders are used to bind the pigment together and allow a film to adhere to the substrate. Examples of binders which are well known in the coatings industry include silicone resins, alkyd resins and acrylic resins. The binders used in the waterborne coatings of the present invention are silicone resins which have been emulsified in water. Heretofore all silicone resins used in high temperature coatings have been the solvent-based type, usually in the 50 to 60 percent silicone solids range. Now excellent coatings can be obtained by the present invention which utilizes a silicone resin-water emulsion which contains less solvent than previously necessary. Furthermore, the silicone resin-water emulsion binder can be diluted with additional water without sacrificing the premium properties required of a coating designed for high temperature service.

Catalysts or driers are materials which increase the rate of the chemical reaction taking place in paint formulations at relatively low temperatures. The catalytic reaction taking place in typical paint formulations is a condensation reaction, such as:

Examples of suitable catalysts for paint coating include zinc, cobalt, manganese and other metals in the form of octoates or napthenates, as well as well known zirconium, calcium and iron catalysts.

Antifreeze agents are materials which prevent an emulsion from freezing by lowering the freezing point of the composition. Suitable antifreeze materials include propylene glycol and ethylene glycol.

Water is also a beneficial component of coating formulations since it may act as a solvent medium as well as a diluent or a carrier, and it allows easy handling of water based coatings when in the form of emulsions.

Silicone resins which may be used in the compositions of the present invention may be prepared by a number of well known processes such as, for example, by hydrolyzing an organohalosilane blend wherein the composition of the resin can be varied by changing the proportions of the constituent organohalosilanes to be hydrolyzed. An exemplary resin might start with a blend of about 60 mole percent methyltrichlorosilane, about 35 mole percent of phenyltrichlorosilane and about 5 mole percent of dimethyldichlorosilane in the presence of water, acetone and a water immiscible organic solvent. In general, this hydrolysis medium could contain from about 1.7 parts to 10 parts of water, 0.2 to 5 parts of acetone and 0.3 to 5 parts of said water immiscible organic solvent per part by weight of the silane blend.

The various components of the hydrolysis mixture can be added concomitantly or separately in any desired order. Generally, the organohalosilanes are added to the mixture of water, acetone and organic solvent. Preferably, when this method is used a proportion of from 2 to 6 parts of water, about 0.3 to about 2 parts of acetone, and about 0.6 to about 2 parts of organic solvent, per part of the total weight of organohalosilane blend, is employed. It is preferred that the organohalosilanes are added to the hydrolysis medium, rather than vice versa, as this limits the concentration of hydrochloric acid which is formed during the hydrolysis reaction. A strong hydrochloric acid solution is undesirable in this example as the hydrochloric acid causes acid polymerization of the acetone forming polymerization products which add undesirable color to the product and have a deleterious effect on the physical properties of the product.

A preferred method to prepare organopolysiloxane resins which may be used in this invention is the dual process. The dual feed process comprises feeding the blend of organohalosilanes and from about 0.9 to 5 parts, preferable 0.9 to 1.2 parts of acetone from separate containers and through separate conduits, then premixing them immediately prior to hydrolysis. It is necessary to limit the contact time if small amounts of water are present in the acetone or in the atmosphere in contact with the organohalosilanes, as the water present causes hydrolysis of the organohalosilanes, thereby generating acid which causes the acetone to polymerize. The initial hydrolysis medium prior to the introduction of the silane blend-acetone mixture contains from about 0 to 4.1 parts of acetone and preferably from 0.9 to 1.2 parts of acetone. The amount of water and organic solvent can be as set forth hereinabove, with preferably from about 3 to 3.5 parts of water and 0.9 to 1.2 parts of organic solvent per part of the total weight of the blend of organohalosilanes.

The temperature of the hydrolysis mixture can be controlled by the rate of addition of the reagents, or by external heat or by cooling if desired. During hydrolysis, a temperature of between about 20° C. to about 40° C. is preferred. After the addition of all the reagents is completed, the mixture is generally agitated for an additional period of time such as 15 to 30 minutes or more to allow for complete hydrolysis of the organohalosilanes. The mixture is then allowed to settle and the acid aqueous (bottom) layer is drawn off from the organic layer. Depending upon individual desires, the organic layer can then be stripped of solvent to a solids concentration of up to 100%. The organic solvent may be stripped under reduced pressure or atmospheric pressure. At this point, the resin may be bodied, i.e., build-up of molecular weight, under total reflux, by condensing and cross-linking silanol units, with the aid of, for example, a catalyst such as iron octoate or Celite (diatomaceous earth) or mixtures thereof, to a desired viscosity, preferably 5-12 cps. at 25 C. at 20% by weight resins solids. Moreover, resin impurities may be removed by filtration, using, for example, filtering aids such as Celite 545 (diatomaceous earth, sold by Johns Manville), Fuller's earth (calcium montmorillonite), and mixtures of the same, or simply by centrifugation. The resulting silanol-containing organopolysiloxane resin has an organo radical to silicon ratio of about 1.05 to 1.

Included among the water-immiscible organic solvents used in the above-described process for providing silicone resins are, for example, hydrocarbons such as benzene, toluene, xylene and the like; esters such as butyl acetate, ethyl acetate, ethers such as diethylether and the like. Toluene is most preferred. In general, however, any water-immiscible organic solvent, which is inert to the hydrolysis reactants during hydrolysis and in which the hydrolyzate is soluble to provide for its separation from the aqueous layer, may be used.

Of course, through the process provided by Traver (in copending application Ser. No. 229,247 described above) it is now possible to disperse these heretofore water-immiscible resins in aqueous media to form water based silicone resin emulsions which can be incorporated in the waterborne silicone coating compositions of the present invention.

One of the classes of emulsifying agents required for these water based silicone resin emulsions are methylcellulose ether products. Suitable methylcellulose ether products are available from Dow Chemical Company under its trademark Methocel. These cellulose ethers are derived from cellulose and contain repeating anhydroglucose units. Methylcellulose or cellulose methyl ether is derived from cellulose by conversion to alkali cellulose which is then reacted with methyl chloride. Hydroxypropyl methylcellulose or propylene glycol ether is similarly manufactured but utilizes propylene oxide in addition to the methyl chloride reactant.

The other class of required emulsifying agents which are used in combination with the above-described cellulose ether products are the anionic emulsifiers or surfactants such as sodium lauryl sulfate, sodium linear alkyl benzene sulfonate, triethanol amine linear alkyl benzene sulfonate, sodium alpha olefin sulfonate, ammonium alkyl phenol ethoxylate sulfate, ammonium lauryl ether sulfate, ammonium alkyl ether sulfate, dialkyl ester of sodium sulfosuccinic acid, sodium cumene sulfonate, and ammonium xylene sulfonate.

The water based silicone resin emulsions of the present invention can be made by any of several methods. Ordinarily the order of addition of ingredients is not critical. One suitable method calls for the dispersion of the cellulose ether agent in water with agitation and heat until the solids are dissolved. The water phase of the emulsion products can also be added in two, three or more parts, as desired. Ordinarily, from 0.25 to 5.0 parts by weight of a combination of cellulose ether and anionic emulsifiers per 100 parts by weight silicone resin solids will be effective for emulsifying such resins in an aqueous system. Those skilled in the art will be able to vary the proportion of the constituent ingredients in order to provide desirable resin emulsion formulations; however, ordinarily there will be, approximately, 5 to 95 weight percent of the cellulosic type emulsifying agent or agents and a corresponding 95 to 5 weight percent of the anionic surfactant type emulsifying agent as the constituents of the combination of emulsifying agents.

Additionally, optional ingredients such as formalin can be added to these emulsions depending upon a given desired end use without seriously detracting from the properties of the water based emulsion. An example of a typical silicone resin which can be used in the emulsions and processes of the present invention is SR-141 which is available from the General Electric Company. The composition to be emulsified will then be blended until uniform whereupon emulsification can be induced by colloid milling of the composition or by homogenization.

A colloid mill found useful for producing laboratory quantities of these water based resin emulsions is Manton-Gaulin Model 2A. Such a mill has a 1 to 40 mil gap which is adjustable and can be operated at atmospheric pressure or under feed pressures of 5 to 40 psig $N_2$. Of course, it is contemplated that those skilled in the art will be able to scale up this process in order to produce commercial quantities of these water-based silicone emulsions.

The viscosity of any resulting emulsion can also be controlled by varying the amount of water included in the blend. This can best be accomplished by first forming a premix comprised of the cellulose ethers and silicone resins along with part of the water. This premix can be emulsified by combining it with the anionic emulsifier and the remaining water.

DESCRIPTION OF THE PREFERRED EMBODIMENTS

In order to better understand the practice of the present invention, the following specific examples are given for the purpose of illustration and are not intended to limit the invention in any way. All parts are measured by weight.

EXAMPLE 1

A typical white waterborne silicone coating formulation can be prepared in the following manner: approximately 225.6 parts rutile pigment ($TiO_2$), 32.2 parts propylene glycol coupling solvent, 4.8 parts dimethyl ethanol amine neutrlizing agent, 32.2 parts Cymel-301 (methoxy methyl melamine initiator used as an air dry crosslinker) and 59.6 parts water are combined in a sand mill and are blended for approximately 15 minutes.

Separately a water based silicone resin emulsion can be prepared in the following manner: 7.2 parts Methocel A25 and 7.2 parts Methocel F50 are slowly charged to a vessel containing 180 parts water which has been preheated to 80 to 90 C. Methocel is a trademark of Dow Chemical Company. Methocel A25 is a methylcellulose powder which exhibits a characteristic viscosity of approximately 25 centipoise at 20 C. in a 2% aqueous solution. The cellulosic powders are dispersed in the preheated water with agitation and the blend is cooled rapidly to 20 C. while adding an additional 180 parts water. To this dispersion is added the silicone resin which is to be emulsified. The silicone resin may be the bodied resin hydrolysis product of, approximately, 30 M% methyltrichlorosilane, 30 M% phenyltrichlorosilane, 20 M% dimethyldichlorosilane and 20 M% diphenyldichlorosilane. This bodied resin is cut with toluene to achieve a 60% silicone resin solids content. 2160 parts of this resin is added to the cellulosic dispersion prepared above along with 1,055 parts additional water, 5.4 parts sodium lauryl sulfate and 6.2 parts formalin. The entire mixture is stirred until uniform whereupon it is colloid milled at atmospheric pressure with an 8 mil gap to form the emulsion. Stirring is continued until room temperature is reached.

The water based silicone resin emulsion produced by the above procedure had an approximate silicone solids content of 30.7% and a viscosity of approximately 650 centipoise at 20 C. This water based silicone resin emulsion will hereinafter be referred to as Emulsion -A.

Next, 1,032 parts of Emulsion -A is combined with 32.2 parts Butylcellosolve coupling solvent (ethylene glycol monobutyl ether) and 6.3 parts of 8% zinc octoate catalyst are added to the pigment mixture described above which has first been filtered. Gentle mixing at 60 to 90 rpm on the sand mill for approximately 15 minutes will provide a uniform water based coating formulation. By adding water, the viscosity can be adjusted to achieve any desired paint consistency. The paint is now ready for coating. The resulting paint formulation had the following approximate physical properties:

| Pigment to binder ratio | 0.7 |
| --- | --- |
| Percent solids | 38.2% |
| pH at 25 C | 7.5 to 8.5 (range) |
| Density | 9.54 lbs/gal |
| Viscosity (No. 4 Ford cup) | 30 to 50 sec |
| Hegman Grind | 5 to 7 |
| Air Dry time | 1 hour |

EXAMPLE 2

Another white waterborne coating formulation was prepared in the following manner: a mill base was first prepared by combining 151.45 parts by weight rutile $TiO_2$, 21.64 parts propylene glycol, 3.22 parts dimethyl ethanol amine, 21.62 parts CYMEL-301, and 39.99 parts water. This mill base was ground in a sand mill without sand at 12,000 rpm for 15 minutes.

Meanwhile, 692.85 parts of the water-based silicone resin Emulsion -A as prepared in Example 1 was combined with 21.64 parts Butylcellosolve, and 1.34 parts of 8% zinc octoate. This resin emulsion mixture was slowly added to the mill base and blended gently until a uniform coating was obtained. This white paint formulation had the following properties:

| Pigment to binder ratio | 0.7 |
| --- | --- |
| % solids | 38.18% |
| % melamine (Compared to resin solids) | Approximately 10% |
| pH at 25 C | 7.5 to 8.5 (Range) |
| Density | 9.54 lbs/gal |
| Viscosity range (No. 4 Ford cup) | 30 to 50 sec |

EXAMPLE 3

Another white waterborne paint formulation was prepared in a similar manner with the following ingredients. First, a mill base was prepared by mixing 175 parts by weight rutile $TiO_2$, 25 parts by weight of a water based silicone resin Emulsion -A as prepared in Example 1, one part by weight of AF-60 which is a silicone based antifoam available from the General Electric Company, 63 parts water, and two parts $NH_4OH$. This mill base was ground in a sand mill without sand at 12,000 rpm for 15 minutes. To the blended mill base was then added an additional 624 parts by weight of the same water based silicone resin Emulsion -A described above, 60 parts Butyl Cellosolve, 50 parts water, and 1.4 parts 8% zinc octoate. This white paint formulation had the following physical properties.

| Pigment to binder ratio | 0.88 |
| --- | --- |
| Percent solids | 37.4% |
| pH at 25 C | 7.5 to 8.5 range |
| Density | 9.58 lbs/gal |
| Viscosity range (No. 4 Ford cup) | 30 to 50 sec |

EXAMPLE 4

A black waterborne composition can be prepared in the following manner. A mill base is prepared by combining 56.4 parts Ferro-F 2302-black, 112.8 parts of No. 1132 graphite, 56.4 parts mesh mica, 32.2 parts propylene glycol, 4.8 parts dimethyl ethanol amine, 32.2 parts CYMEL-301, and 180.0 parts water. This mill base is ground in a sand mill, again without sand at 12,000 rpm for 15 minutes. To this ground mill base is then slowly added 1,032 parts by weight of the water based silicone resin emulsion -A as prepared in Example 1, 32.2 parts Butylcellosolve, and 0.8 parts 8% zinc octoate. This black painting composition had the following physical properties.

| Pigment to binder ratio | 0.7 |
| --- | --- |
| % solids | 40% |
| pH at 25 C. | 7.5 to 8.5 range |
| Density | 8.14 lbs/gal |
| Viscosity range (No. 4 Ford cup) | 30 to 50 sec |

EXAMPLE 5

Another black waterborne formulation was produced in the following manner. A mill base was comprised of 225.6 parts by weight R.C. No. 450' black, 32.2 parts propylene glycol, 4.8 parts dimethyl ethanol amine, 32.2 parts CYMEL-301, and 59.6 parts water which were all ground in a sand mill without sand at 12,000 rpm for 15 minutes. To this ground mill base was slowly added 1,032 parts of silicone resin Emulsion -A as prepared in Example 1 and which contained 30.7% silicone solids, 32.2 parts Butylcellosolve, and 1.5 parts zinc octoate (8%). These ingredients were gently blended into the mill base until a coating formulation having the following physical properties was obtained:

| Pigment to binder ratio | 0.7 |
|---|---|
| % solids | 38.2% |
| pH at 25 C. | 7.5 to 8.5 |
| Density | 9.61 lbs/gal 9.61 |
| Viscosity range (No. 4 Ford cup) | 30 to 50 sec |

EXAMPLE 6

Another white waterborne coating can be provided utilizing the following procedure which contains a different silicone resin emulsion than that utilized in the previous examples.

First a typical mill base was prepared by combining 225.6 parts rutile TiO$_2$, 32.2 parts propylene glycol, 4.8 parts dimethyl ethanol amine, 32.2 parts CYMEL-301, and 59.6 parts water. This mill base was ground in a sand mill without sand for 15 minutes at 12,000 rpm. To this ground mill base was added 666.6 parts by weight of water based silicone resin Emulsion -B, 32.2 parts Butylcellosolve, and 1.5 parts 8% zinc octoate. The water based silicone resin Emulsion -B utilized in this coating formulation is obtained in the following manner. First 180 parts by weight of water is heated to approximately 80° C. whereupon 7.2 parts of each of Methycel A25 and Methycel F50 are added to the heated water and slowly dispersed. The mixture is cooled rapidly to about 20 C. as 180 parts by weight of additional water is added. This cellulosic dispersion is added to 2,160 parts by weight of SR 182 silicone resin, available from General Electric Company. This resin typically has a silicone resin solids content of approximately 60% silicone solids by weight in toluene. For purposes of this example a concentrated version of SR 182 having a high solids content of approximately 80% solids by weight was utilized in order to obtain a high solids coating. Separately 1,055 parts by weight water is blended with 5.4 parts sodium lauryl sulfate and 6.2 parts formalin. This mixture is then added to the resin -cellulose blend and stirred until uniform. The uniform mixture is then milled in a colloid mill having an 8 mil gap at atmospheric pressure. The resulting emulsion is then stirred until room temperature is reached. The resulting white paint formulation has the following physical properties:

| Pigment to binder ratio | 0.7% |
|---|---|
| Solids | 52% |
| pH at 25 C. | 7.5 to 8.5 |
| Density | 10.6 lbs/gal |
| Viscosity range (With No. 4 Ford cup) | 30 to 50 sec |

We claim:

1. A waterborne silicone coating composition comprising:
   (a) 50 to 70 parts by weight of a silicone resin-water emulsion comprised of 100 parts by weight of (i) at least one organopolysiloxane resin composition comprising units selected from the group consisting of R$_3$SiO$_{0.5}$, R$_2$SiO, R SiO$_{1.5}$ and SiO$_2$, wherein R is, independently, a substituted or unsubstituted monovalent hydrocarbon radical and said organopolysiloxane resin has an R to Si ratio of, approximately, 1.0 to 1.99 R groups for each silicon atom;
   (ii) a combination of emulsifying agents effective for dispersing said organopolysiloxane resin in a water based emulsion wherein said emulsifying agent combination is comprised of 5 to 95 percent by weight of a cellulosic emulsification agent and 5 to 95 percent by weight of an anionic emulsifying agent; and (iii) an amount of water effective for providing a preselected silicone resin solids content by weight of said silicone resin-water emulsion;
   (b) 25 to 50 parts by weight pigment;
   (c) 4 to 12 parts by weight coupling solvent;
   (d) 0 to 1 parts by weight neutralizing agent;
   (e) 4 to 8 parts by weight water; and
   (f) 0 to 0.2 parts by weight catalyst.

2. A coating composition as in claim 1 wherein said combination of emulsifying agents is present in an amount of, approximately, 0.25 to 5.0 parts by weight of said combination per 100 parts of said organopolysiloxane resin.

3. A coating composition as in claim 1 wherein said pigment is selected from the group consisting of iron oxides, titanium oxides, zinc oxides, cobalt oxides, chromium oxides, lead chronates, mica, and talc.

4. A coating composition as in claim 1 wherein said coupling solvent is selected from the group consisting of propylene glycol, ethylene glycol monobutyl ether, and 2,2,4-trimethyl-1.3-pentanediol monoisbutyrate.

5. A coating composition as in claim 1 wherein said neutralizing agent is dimethyl amine ethanol.

6. A coating composition as in claim 1 wherein said catalyst is selected from napthenates of metals selected from the group consisting of octoates and napthenates of metals selected from the group consisting of zinc, cobalt, manganese, zirconium, calcium and iron.

7. A coating composition as in claim 1 further comprising a pigment dispersant.

8. A coating composition as in claim 1 further comprising a surfactant wetting additive.

9. A coating composition as in claim 1 further comprising an extender selected from the group consisting of mica, talc, clay and barium sulfate.

10. A coating composition as in claim 1 wherein said cellulosic emulsifying agent is selected from methylcellulose and hydroxypropyl methylcellulose and combinations thereof.

11. A coating composition as in claim 1 wherein said anionic emulsifying agent is selected from the group consisting of sodium lauryl sulfate, sodium linear alkyl benzene sulfonate, triethanol amine linear alkyl benzene sulfonate, sodium alpha olefin sulfonate, ammonium alkyl phenol ethoxylate sulfate, ammonium lauryl ether sulfate, ammonium alkyl ether sulfate, dialkyl ester of sodium sulfosuccinic acid, sodium cumene sulfonate, and ammonium xylene sulfonate.

12. A process for providing a waterborne silicone coating composition comprising the steps of:
   I. providing a mill base comprised of, approximately, 25 to 50 parts by weight pigment, 4 to 12 parts by weight coupling solvent, 0 to 1 parts by weight neutralizing agent, 0 to 0.2 parts by weight catalyst, and 4 to 8 parts by weight water;
   II. blending said mill base with 50 to 70 parts by weight of a silicone resin-water emulsion.

13. A process as in claim 12 wherein said silicone resin-water emulsion is provided by a process comprising the steps of:
   I. combining (i) at least one organopolysiloxane resin comprised of units selected from the group consisting of R$_3$SiO$_{0.5}$, R$_2$SiO, R SiO$_{1.5}$, and SiO$_2$ units, wherein R is, independently, a substituted or unsubstituted monovalent hydrocarbon radical and said resin has an R to Si ratio of, approximately, 1.0 to 1.99 R groups for each silicon atom, with (ii) an amount of water effective for providing a preselected silicone resin solids content by weight of said silicone resin-water emulsion; and II. emulsifying said silicone resin-water mixture with (iii) a combination of emulsifying agents effective for dispersing said organopolysiloxane resin in a water based emulsion, wherein said combination of emulsifying agents is comprised of 5 to 95 percent by weight of a cellulosic emulsifying agent and 5 to 95 percent by weight of an anionic emulsifying agent.

14. A process as in claim 13 wherein said combination of emulsifying agents is utilized in an amount, of, approximately, 0.25 to 5.0 parts by weight of said combinastion per 100 parts of said organopolysiloxane resins.

15. A process as in claim 12 further comprising the steps of coating said coating composition on a substrate and drying said coating thereon.

16. A process as in claim 15 wherein said coating step is accomplished by spraying, brushing, dipping and roll coating.

17. A process as in claim 13 wherein said coating composition further comprises surfactant wetting agent.

18. A process as in claim 13 wherein said coating composition further comprises an extender selected from the group consisting of mica, talc, clay, and barium sulfate.

19. A process as in claim 13 wherein said coating composition further comprises a pigment dispersant.

20. A process as in claim 13 wherein said cellulosic emulsification agent is selected from methylcellulose and hydroxypropyl methylcellulose and combinations thereof.

21. A process as in claim 13 wherein said anionic emulsifying agent is selected from the group consisting of sodium lauryl sulfate, sodium linear alkyl benzene sulfonate, triethanol amine linear alkyl benzene sulfonate, sodium alpha olefin sulfonate, ammonium alkyl phenol ethoxylate sulfate, ammonium lauryl ether sulfate, ammonium alkyl ether sulfate, dialkyl ester of sodium sulfosuccinic acid, sodium cumene sulfonate, and ammonium xylene sulfonate.

* * * * *